UNITED STATES PATENT OFFICE.

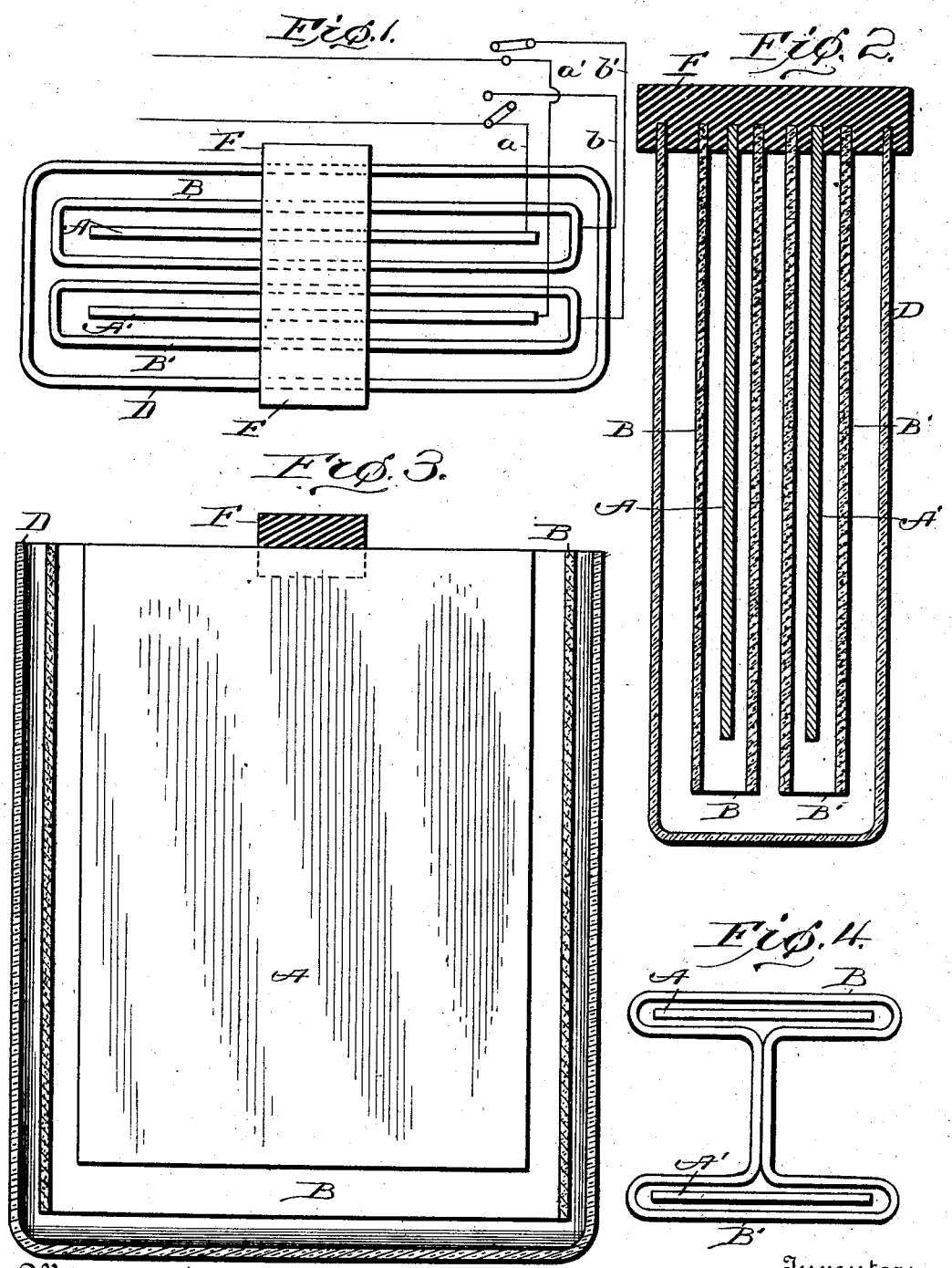

HARRY S. AMWAKE, OF CAMDEN, NEW JERSEY, ASSIGNOR TO CHARLES H. GRAHAM AND GEORGE D. BOUTON, OF PHILADELPHIA, PENNSYLVANIA.

ELECTROCHEMICAL GENERATOR.

SPECIFICATION forming part of Letters Patent No. 707,372, dated August 19, 1902.

Application filed June 13, 1902. Serial No. 111,556. (No model.)

*To all whom it may concern:*

Be it known that I, HARRY S. AMWAKE, a citizen of the United States, residing in the city and county of Camden, State of New Jersey, have invented a new and useful Improvement in Electrochemical Generators, which is more particularly useful in electrical accumulators, of which the following is a specification.

My invention is an improvement upon that described in my Patent No. 702,760, dated June 17, 1902. In accordance with the invention of said application I surround the positive or negative electrode of a single-fluid electrochemical generator by a current-conducting baffle of such nature as will retard the action of the electrolyte in attacking the electrode most to be acted upon. This baffle may be either metallic, semimetallic, or non-metallic so long as it is made of a current-conducting substance or compound, and it may be either porous or dense in structure. One object of this baffle is to prevent the circulation of the electrolyte or the motion of the free electrolytic ions from one electrode directly to the other and to do away with the harmful results brought about by such direct circulation or movement in ordinary single-fluid batteries. Another object of the baffle is to give to the electrolytic circulation more or less defined paths, determined by the location of the baffles with reference to the electrode, whereby a flow of the electrolyte shall be produced which shall not be local and confined to small portions of the area of the electrode, but which shall take in large surfaces of the entire electrode and which shall reach and be refreshed by the main body of the electrolyte of the electrochemical generator. Still a third object of this baffle is to reduce the thickness of the electrolyte between the two electrodes to a greater extent than has heretofore been possible. The baffle being of a material having a higher conductivity than the electrolyte, it is plain that the combined electrical resistance of the bodies of the electrolyte on each side of the baffle added to the resistance of the baffle is less than would be the case if this baffle were removed and replaced by an equal thickness of the more highly resisting electrolyte. This baffle therefore enables me to place the electrodes at a sufficient distance apart so that their undue proximity shall not produce harmful results, and yet not to introduce as much resistance between the electrodes as it is necessary to introduce in ordinary batteries not supplied with the baffles when the electrodes of such batteries are placed at their minimum distance apart. In fact, in the practical application of my invention I am enabled to use a baffle in such relation to the electrodes that the electrolyte between the baffle and the electrodes shall, in effect, amount to no more than a mere film, which means that my battery has, other things being equal, a small internal resistance and consequent high efficiency.

Independent of any considerations of theory involved in the operation of my baffle, some of which have been outlined above, I may say, speaking from a practical standpoint, that the use of my baffle enables me to operate electrochemical generators so that the energy which is represented by the chemical action does not much exceed the energy represented by the current which is given from the generator, which means that an electrochemical generator provided with my baffle has a high efficiency.

My present invention is an improvement upon that described in my prior application and an improvement which is peculiarly useful in connection with electrical accumulators.

It consists in using a baffle in connection with both the positive and the negative electrode—that is to say, in using one baffle to surround the positive electrode or electrodes and another baffle to surround the negative electrode or electrodes.

In this connection attention is called to the fact that in electrical accumulators the positive electrode in charging becomes the negative electrode in discharging, a corresponding remark applying to the other electrode. With the construction shown in my former application, in which the baffle surrounds the positive or negative electrode only, it would be necessary in ordinary constructions of accumulators to do without the full advantage of the baffle either in charging or discharging. In the present invention the same generator and baffles without change will act with high efficiency both in charging and discharging.

In the drawings, Figure 1 is a plan of my electrochemical generator. Fig. 2 is a vertical cross-section on the line 2 2. Fig. 3 is a vertical cross-section on the line 3 3, and Fig. 4 is a detail.

The generator consists of the usual cell or case D, containing the electrolyte, and the usual positive and negative electrodes A and A', respectively. These electrodes may be held in position by being inserted in slots in an insulating bridge-piece F, as shown.

Surrounding the electrodes A and A' are the baffles B and B', respectively. These baffles may also be fastened in position by being inserted in slots or grooves in the bridge-piece F, although it is to be understood that this bridge-piece is merely one of a number of supporting and retaining devices which may be employed. The baffles B B', as seen, completely surround the electrodes; but they do not inclose them, for these baffles are open at their lower ends. This prevents a circulation of the electrolyte from one electrode directly across to the other electrode. Such circulation must naturally take a somewhat circuitous path down through the bottom of the baffle. It seems that the free electrolytic ions must take the same path. The baffles are normally insulated from the electrodes. Disregarding the electrolyte, they may or may not be insulated from each other. In fact it is sometimes of advantage to mechanically connect them, in which case they would usually, though not necessarily, be electrically connected. One of a number of such constructions I have shown in Fig. 4, in which the baffles B and B' are built of a sheet of lead bent into H form, the two thicknesses of the metal forming the cross-piece of the H being pressed closely together, so as to leave no space therebetween for the passage of the electrolyte. The electrodes A A' are placed within spaces represented by each vertical leg of the H structure and may be in the form of very thin films. As explained in my aforesaid patent, the heat generated by the electrolytic action will be greater near the vertical central portion of the electrodes than at the two vertical edges of the electrodes. This will cause a convection-current upward along the center of the electrodes and downward at the edges of the electrodes, which is far more beneficial in action than the multiplicity of ill-defined and purely local convection-currents set up in ordinary batteries. Furthermore, it will be noticed that when the convection-currents set up within my baffle reach the bottom of the baffle they will naturally draw in fresh electrolyte from the body of the electrolyte found in the cell. In this manner fresh electrolyte at a uniform strength is kept in constant renewed contact with the entire surface of the electrode, which results in the case of primary batteries, as I have particularly demonstrated, in a more thorough chemical action and in causing the electrode to wear away uniformly over its entire surface. I may add that I am enabled to use an electrolyte of a more than usually high specific gravity, which also adds to the battery efficiency. The baffle, as I have before said, must be a conductor, although it need not be necessarily a good conductor, and I may make it of carbon, which is a material well adapted for the purpose, or of lead or iron or of many other suitable materials.

Where demands for an extraordinary charge of current occur for short periods of time, the baffle B may be placed in parallel circuit with the electrode A by means of the current-leads $a\ b$. At the same time the baffle B' may be placed in parallel circuit with the electrode A' by means of the current-leads $a'\ b'$. The material of the baffle in this case may be the same as that of the electrode—that is, if I use electrodes of lead I may make my baffles of lead. At the same time I may make my baffles of a different material, such as carbon, even though my electrodes are made of lead.

What I claim is—

1. An electrochemical generator consisting of a single-fluid cell, provided with a positive electrode, a negative electrode, an electrolyte and current-conducting baffles in said electrolyte respectively surrounding each of said electrodes and normally insulated therefrom, substantially as described.

2. An electrochemical generator consisting of a single-fluid cell, provided with a positive electrode, a negative electrode, and an electrolyte, current-conducting baffles in said electrolyte respectively surrounding each of said electrodes and normally insulated therefrom, and means for placing in parallel circuit each electrode and its surrounding baffle.

3. An electrochemical generator consisting of a single-fluid cell provided with a positive electrode, a negative electrode, an electrolyte and mechanically-connected current-conducting baffles in said electrolyte respectively surrounding each of said electrodes and normally insulated therefrom, substantially as described.

In testimony whereof I have signed my name to this specification in the presence of two subscribing witnesses.

HARRY S. AMWAKE.

Witnesses:
WATSON B. RULON,
JOHN A. WIEDERSHEIM.